United States Patent [19]

Parmelee et al.

[11] Patent Number: 4,731,518

[45] Date of Patent: Mar. 15, 1988

[54] GUN AND CABLE FOR GAS METAL ARC WELDING

[75] Inventors: Donald R. Parmelee, Lyndhurst; Joseph R. Nosse, Richmond Heights, both of Ohio

[73] Assignee: The Lincoln Electric Company, Cleveland, Ohio

[21] Appl. No.: 940,868

[22] Filed: Dec. 12, 1986

[51] Int. Cl.[4] .................................................. B23K 9/10
[52] U.S. Cl. ........................... 219/137.31; 219/137.42; 219/137.9; 74/526; 200/153 T
[58] Field of Search ............. 219/136, 137.31, 137.42, 219/137.44, 137.51, 137.8, 137.9, 137.61, 137.63, 74; 200/153 T; 74/526

[56] References Cited

U.S. PATENT DOCUMENTS

| | | | |
|---|---|---|---|
| 2,790,925 | 4/1957 | Landis | 314/69 |
| 2,864,934 | 12/1958 | Bernard et al. | 219/74 |
| 2,873,357 | 2/1959 | Landis | 219/138 |
| 3,025,387 | 3/1962 | Kinney | 219/130 |
| 3,089,022 | 5/1963 | Kinney | 219/136 |
| 3,198,925 | 8/1965 | Starrantino | 74/526 |
| 3,469,070 | 9/1969 | Bernard et al. | 219/137.61 |
| 3,576,423 | 4/1971 | Bernard et al. | 219/137.63 |
| 3,689,733 | 9/1972 | Matasovic | 219/136 |
| 3,806,695 | 4/1974 | Carroll | 219/126 |
| 3,909,586 | 9/1975 | Landis et al. | 219/136 |
| 4,403,136 | 9/1983 | Colman | 219/137.63 |
| 4,554,432 | 11/1985 | Raloff | 219/137.44 |

OTHER PUBLICATIONS

The Lincoln Electric Co., The LN-23P... A Semiautomatic Wire Feeder for Portability, Jul. 1986, entirety.
The Lincoln Electric Co., The Heavy Duty LN-8 Line Offers, Nov. 1986, entirety.
The Lincoln Electric Co., The Wire Feeder That Thinks, The LN-9, Jan. 86, entirety.

Primary Examiner—E. A. Goldberg
Assistant Examiner—Huan H. Tran
Attorney, Agent, or Firm—Body, Vickers & Daniels

[57] ABSTRACT

An electrode gun and cable for feeding a welding electrode and shielding gas to a workpiece having an improved arrangement for supplying the gas to the arc and for electrifying the electrode in the contact tip. The cable is designed to resist abuse and purge air entering with the electrode. The gun nozzle has a square passage to receive the electrode guide and provide unobstructed gas passages. The trigger has a flexible member engaging the on-off switch to prevent damage thereto from too much pressure by the operator.

10 Claims, 14 Drawing Figures

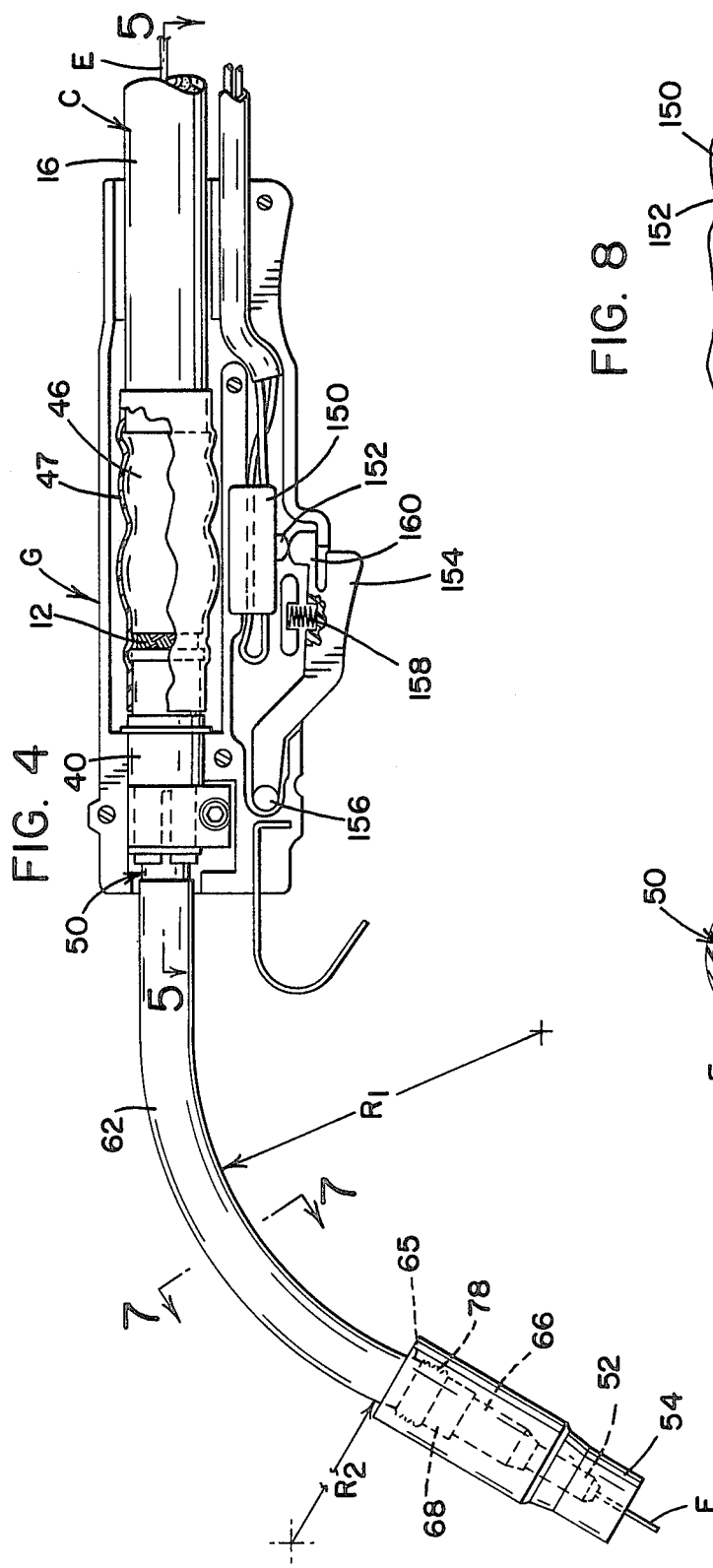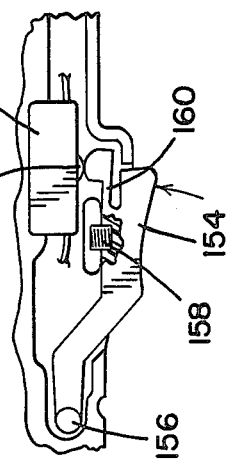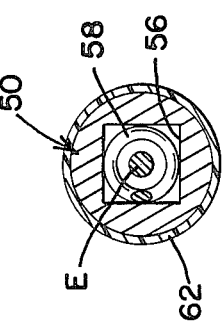

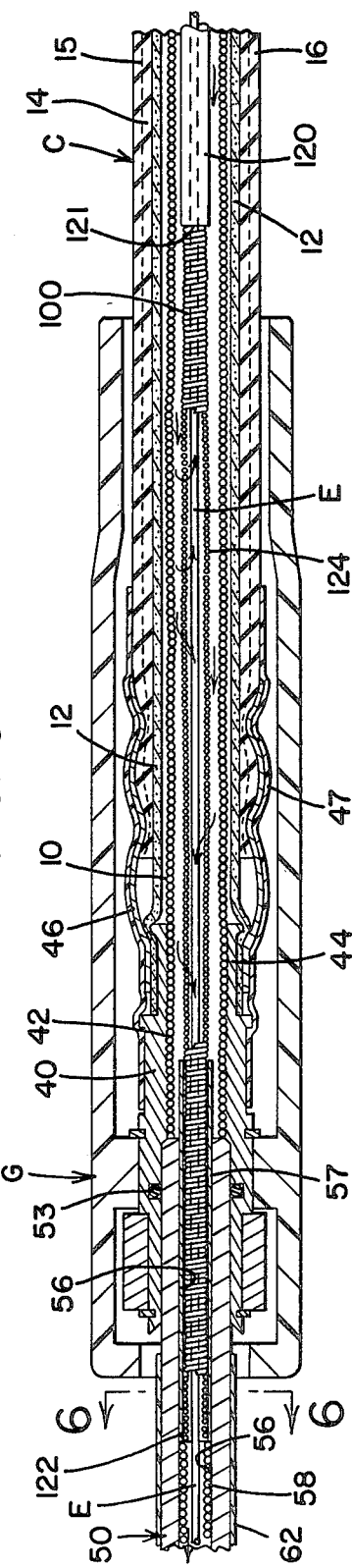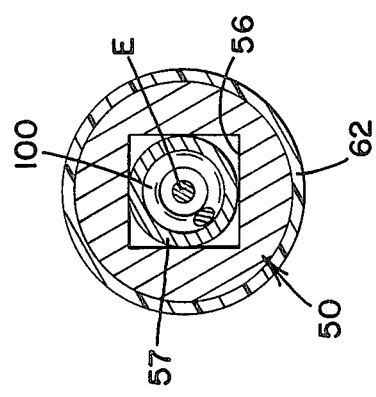
FIG. 5
FIG. 6

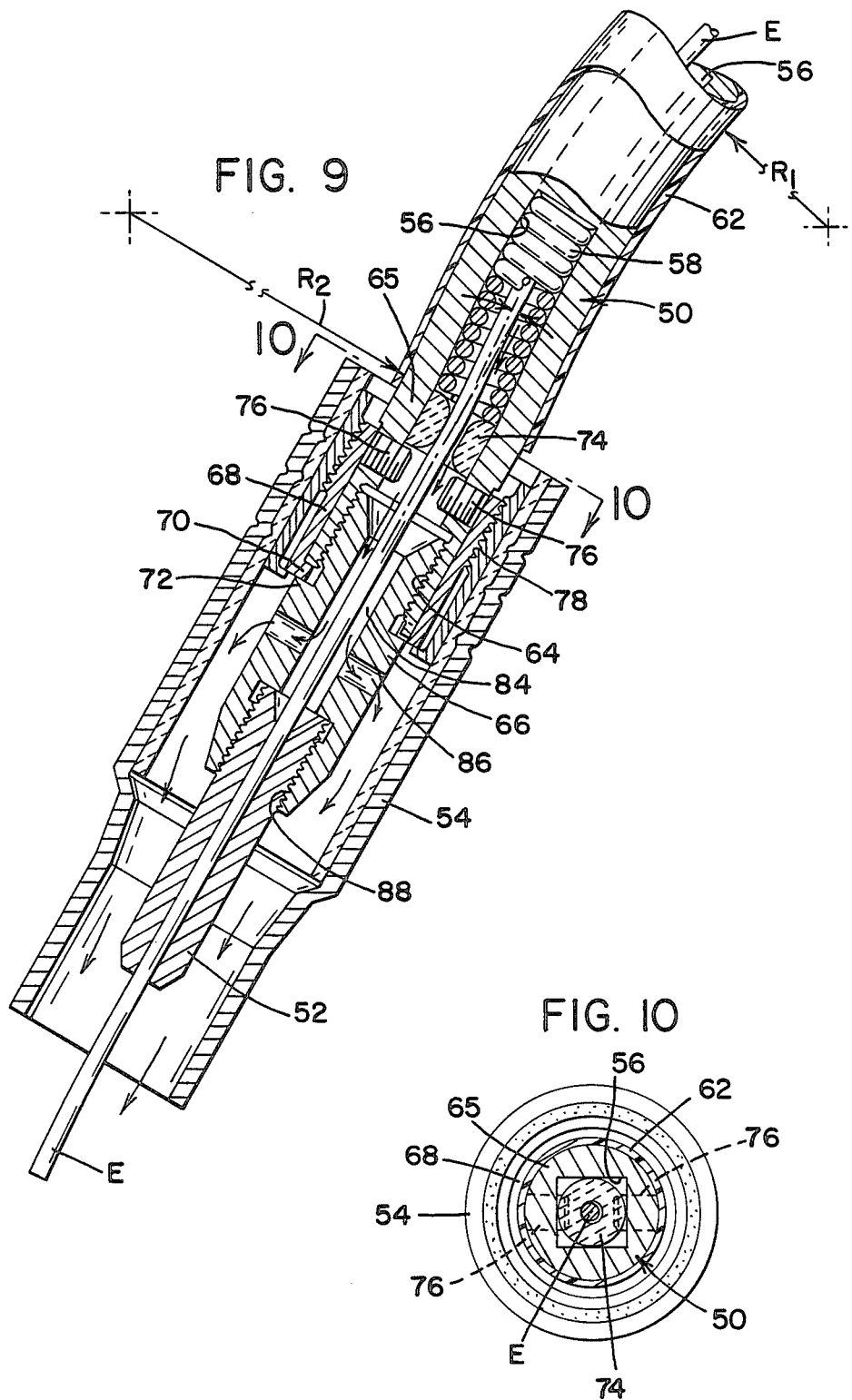

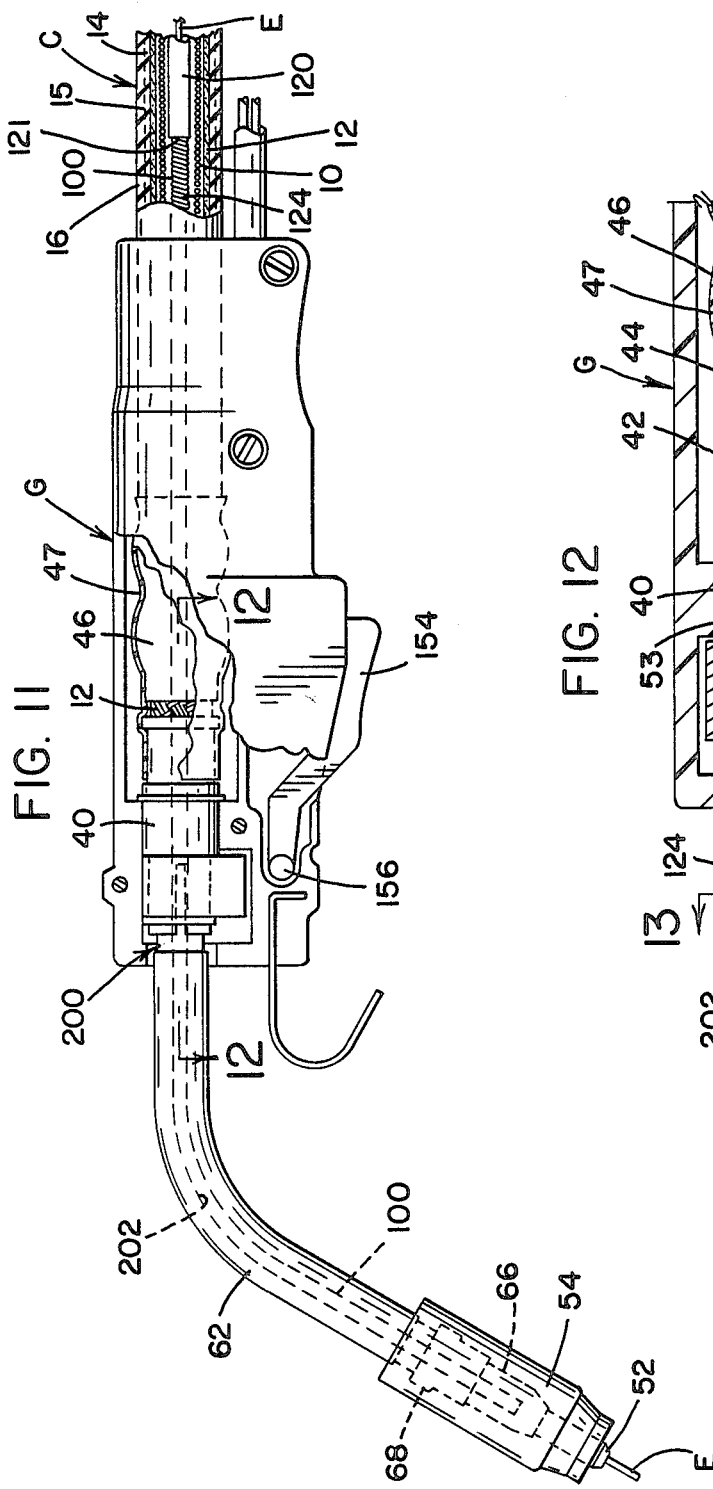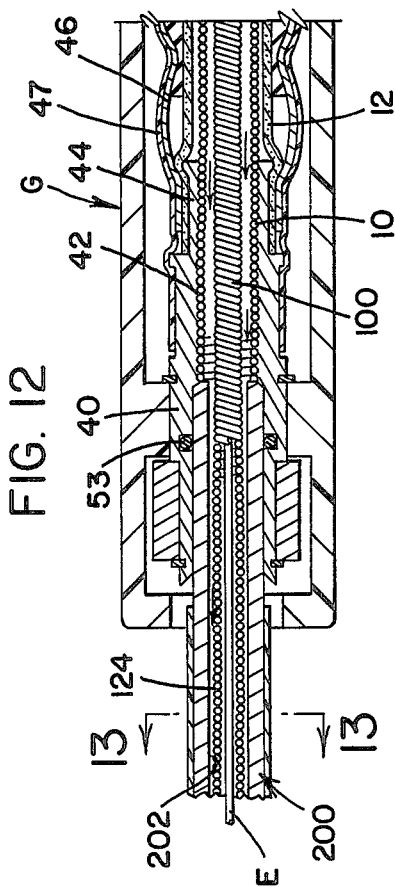

GUN AND CABLE FOR GAS METAL ARC WELDING

This invention pertains to the art of electric arc welding and, more particularly to a gun and cable assembly for feeding an electrically energized wire electrode and a coaxial shield of gas to a workpiece to be welded.

In the field of gas shielded metal arc welding, it is conventional to provide: a gun through which a steel wire electrode and gas are fed coaxially towards a workpiece; a source of gas under pressure; an electrical power source; a wire feeder; and, a heavy cable interconnecting the gun to the gas power source and the wire feeder.

The gun normally includes a handle at one end of an elongated barrel through which the electrode and gas must freely pass with the electrode being electrically energized within an electrode nozzle at the end of the barrel and the gas diffused into a cylindrical stream around the electrode as it emerges from the nozzle.

The handle normally includes a trigger which actuates a microswitch which in turn controls electrical circuits which open a gas valve and turn on the electrical power source.

The cable normally includes in an assembly, a wire guide comprised of an elongated helical tight wound spring, a copper conductor and a gas tight rubber case which must withstand the maximum gas pressures which might be experienced in a welding operation. The power source and gas source are normally located in a protected location while the welding takes place at locations often quite remote from the power and gas sources. The cable leading to the gun is often subjected to extreme abuse. Thus, trucks sometimes run over it, it is dragged on the floor and over objects, it is pulled around corners, and/or it may be twisted or kinked. Damage to the cable can render the welding operation impossible.

For ease of welding, the barrel between the handle and the nozzle is of a small diameter and which heretofore has made feeding of the gas therethrough to the nozzle somewhat difficult.

In the prior art, difficulty has been experienced in providing good electrical connections between the fittings at each end of the cable and the copper conductors of the cables. If these connections are not properly made, they can overheat even to the point of destroying the cable ends. Still a further problem has been that, if for some reason or other the gas pressure regulating valve between the gas source and the cable malfunctions, the gas pressure is sufficient to bulge or rupture the rubber hose.

A still further problem has been in maintaining a consistently good electrical connection between the tip of the barrel and the electrode at a precise and uniform distance from the point where the electrode emerges from the electrode nozzle.

THE INVENTION

The present invention contemplates a new and improved cable and gun arrangement of the type described which overcomes all of the above-referred to difficulties and others and provides a cable and gun design which is economical to manufacture, provides for easy flow of gas to the electrode nozzle, has good electrical properties, and is easy to operate.

In accordance with one aspect of the present invention, a cable is provided comprised of an elongated tight wound helical tube formed of spring wire and having an inner diameter greater than the diameter of an electrode guide to be inserted therein, multiple strands of small diameter copper wire wrapped around the helix with a lay for good flexibility, a first rubber jacket extruded around the copper wires, a braid of cotton or synthetic cord around the rubber jacket and a second rubber jacket surrounding the braid.

Further in accordance with the invention, an end fitting and cable combination are provided wherein the fitting is in the form of a sleeve with one end threaded on the inside and threadably engaged with an end of the helical tube and reduced in diameter on the outside sufficiently small to fit between the helical tube and the copper wires and soldered thereto, and a gas fitting extending through the side of the sleeve to communicate a gas source with the inside of the fitting and helical tube.

Further in accordance with the invention, a welding gun is provided comprised of a handle having an opening at one end adapted to receive and coact with a fitting on one end of the cable and at the other end having an arcuate barrel extending therefrom, the barrel having a non-cylindrical, e.g., a polygonal shaped passage therethrough, a cylindrical electrode wire guide therein formed of a helical spring whereby the shielding gases can pass through the barrel in the corners of the polygon between the outer surfaces of the guide and the walls of the polygon. The polygon is preferably square.

Further in accordance with the invention, a contact tip is fitted on the exit end of the arcuate barrel with an axis at an angle to the tangent of the curve of the barrel at its end so that the electrode has a reverse bend therein forcing it against the sides of the contact tip so as to be electrically energized thereby at a fixed point adjacent to the end of the tip, all in combination with a gas diffuser and gas nozzle surrounding the contact tip for guiding a coaxial stream of shielding gas toward the workpiece to be welded.

Further in accordance with the invention, the handle has a microswitch mounted thereon in combination with a hand operated trigger, the trigger having a stop to limit its movement and a flexible cantilevered arm engaging the operating button of the microswitch for preventing excessive pressures on the microswitch.

OBJECTS

The principal object of the invention is the provision of a new and improved gun and cable design for gas metal electric arc welding, which is simple in construction, economical to manufacture and easy to weld with.

Another object of the invention is the provision of a new and improved cable for feeding an electrode and shielding gas to a welding gun which is resistant to crushing, kinking, excessive bending, and excessive gas pressures.

Another object of the invention is the provision of a new and improved cable for feeding a welding electrode and gas to a welding gun wherein the joints between the copper conductors of the cable and the end fittings are soldered to the end fittings and the soldered joint is coaxial about the gas flow to provide a gas seal.

Another object of the invention is the provision of a new and improved arrangement for preventing excessive forces on the operating button of a microswitch when the trigger on the handle is operated.

Another object of the invention is the provision of a new and improved arrangement for insuring that the electrode is electrically energized at a predetermined and consistent distance from the end of the contact tip.

PREFERRED EMBODIMENTS

The invention may take physical form in certain parts and arrangements of parts, a preferred embodiment of which will be described in detail in this specification and illustrated in the accompanying drawings which form a part hereof and wherein:

FIG. 4 is a cross-sectional view of FIG. 1 taken approximately on the line 4—4 thereof showing the welding gun and its trigger mechanism for actuating the on-off microswitch;

FIG. 5 is an enlarged cross-sectional view of FIG. 4 taken approximately from the line 5—5 thereof showing how the cable and one end of the barrel interconnect;

FIG. 6 is a cross-sectional view of FIG. 5 taken approximately from the line 6—6 thereof;

FIG. 7 is a cross-sectional view of FIG. 4 taken approximately from the line 7—7 thereof showing a cross-section of the barrel;

FIG. 8 is a detailed view of the trigger mechanism shown in FIG. 4 but in the actuated position;

FIG. 9 is an enlarged cross-sectional view of the barrel end contact tip and gas nozzle;

FIG. 10 is a cross-sectional view of FIG. 9 taken approximately on the line 10—10 thereof.

FIG. 11 is a side elevational view partly in section of an alternative embodiment of the invention;

FIG. 12 is a cross-sectional view of FIG. 11 taken approximately on the line 12—12 thereof;

DESCRIPTION OF THE PREFERRED EMBODIMENT

Figure 1:
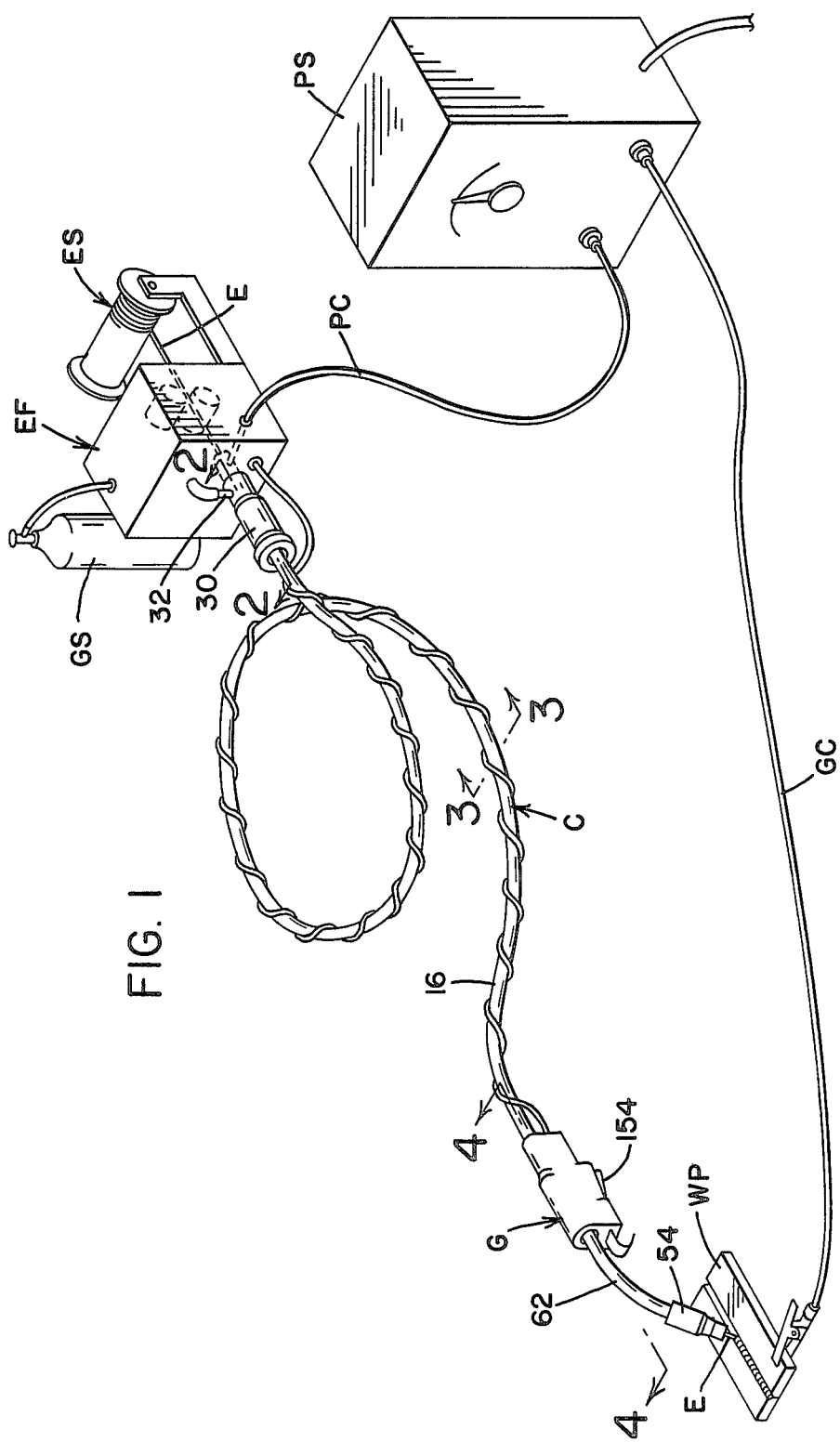
FIG. 1 is a schematic perspective view of a gas metal arc welding system using the present invention.

Referring now to the drawings wherein the showings are for the purposes of illustrating preferred embodiments of the invention only and not for the purposes of limiting same, FIG. 1 shows a gas metal arc welding setup including: a gun G for feeding an electrically energized electrode E and a coaxial gas shield to a workpiece WP; an electrode source ES; an electrode feeder EF; a gas source GS; an electrical power source PS connected to the workpiece WP by a ground cable GC and to the welding gun through a power cable PC; and a welding cable C, which is also arranged to conduct the gas to the welding gun G.

The electrical power source PS, gas source GS, electrode feeder EF and electrode source ES are conventional and form no part of the present invention and will not be described further herein.

Figure 2:
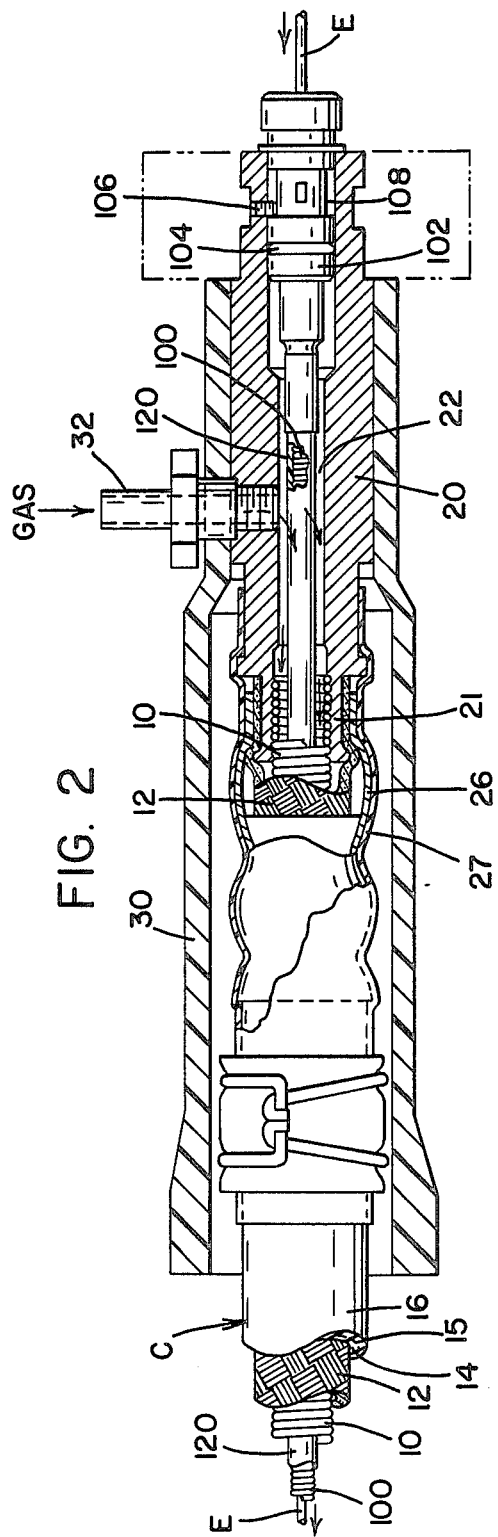
FIG. 2 is a cross-sectional view of FIG. 1 taken approximately on the line 2—2 thereof with certain parts in elevation showing the fitting and cable arrangement at the inlet end of the welding cable.
Figure 3:
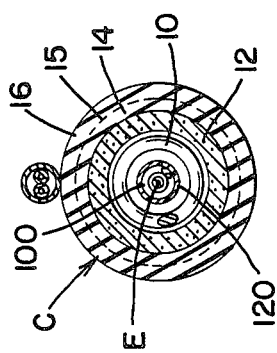
FIG. 3 is a cross-sectional view of FIG. 1 taken approximately from the line 3—3 thereof.
Figure 14:
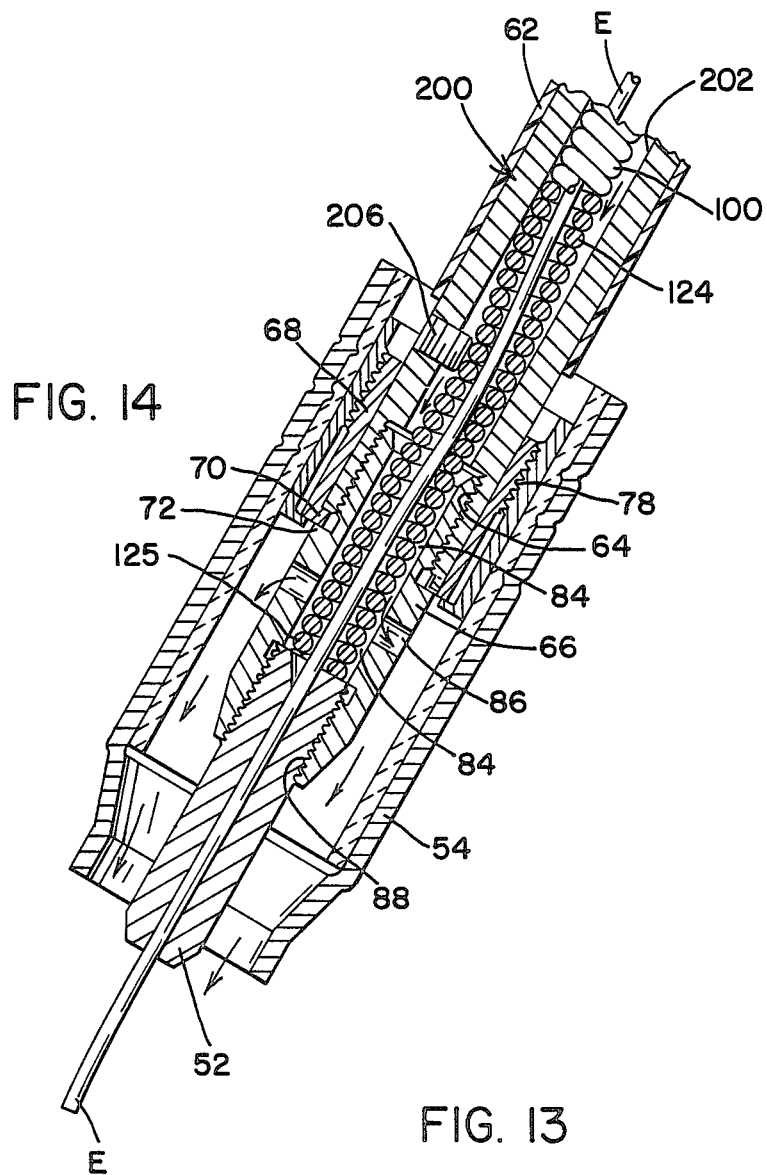
Figure 13:
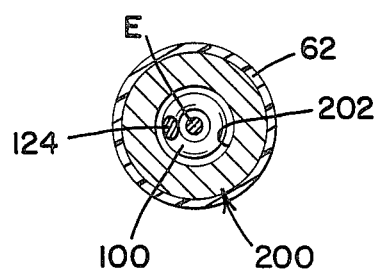
FIG. 13 is a cross-sectional view of FIG. 12 taken approximately on the line 13—13 thereof; and, FIG. 14 is an enlarged cross-sectional view of the contact tip and gas nozzle construction of FIG. 11.

The welding cable C forms an important part of the present invention and as shown in FIG. 2 is comprised generally of reading from the inside out: a gas conductor tube 10 formed of an elongated helix of spring steel wire; a copper conductor 12 formed of a plurality of strands of small diameter copper wire all wrapped around the tube 10 with a lay that gives good flexibility; a first rubber jacket 14 extruded around the copper conductors; a braid of fine cord 15; and a second rubber jacket 16 extruded over the braid 15.

Such a construction provides for a maximum of flexibility of the cable C with the ability to resist high gas pressures should they ever develop, an ability to withstand high crushing forces, and a resistance against kinking or sharp bends being formed in the cable.

The right or entrant end of the cable C (see FIG. 2) is terminated in a fitting comprised of a sleeve 20 of brass or other high conductivity metal having an inner passageway 22, the left hand end of which is threaded so as to threadingly coact with the right hand end of the helical tube 10 after the right hand ends of the two rubber jackets and the braid are removed. The left hand end 21 of the sleeve 20 is reduced in diameter and fits between the outer surface of the tube 10 and the inner surface of the conductor 12. After assembly, the conductor 12 and the end 21 are soldered together by conventional means to provide a gas tight joint. This end of cable C and the soldered joint are enclosed by a strain relief in the form of a crimped metal tube 26. A heat shrinkable non-metallic jacket 27 encloses the entire assembly to form a gas tight seal. A cylindrical handle of electric insulating material fits over the sleeve 20 and the right hand end of the cable C. A tubular fitting 32 extends through an opening in the handle 30 and the sleeve 20 to communicate gas from the gas source GS to the passage 22 on the inside of the sleeve 20. The right or entrant end of fitting 20 extends beyond handle 30 and is shaped to coact with an electrically energized socket in the electrode feeder EF as is conventional.

The left hand or exit end of the cable C (see FIG. 5) is terminated in a fitting comprised generally of a sleeve 40 having an inner passage 42, the right hand end of which is threaded so as to threadingly engage the helical tube 10. The two rubber jackets and the braid are removed at the left hand end of the cable and the sleeve 40 has a portion 44 of reduced diameter inserted between the outer surface of the tube 10 and the inner surface of the conductor 12 and is soldered thereto by conventional means. A crimped metal tube 46 surrounds the left hand end of the cable and this soldered joint forming a strain relief. The assembly is then enclosed in a heat shrinkable jacket 47 to form a gas tight seal.

In the preferred embodiment of the invention, the electrode E is fed from the electrode feeder EF to and through the handle of the welding gun through an electrode guide 100 in the form of an elongated spring wire helix of an inner diameter to freely pass the electrode E and an outer diameter less than the inner diameter of the gas conductor tube 10. This guide 100 at its right or entrant end extends into a fitting 102 and is held therein by means of crimping. This fitting 102 fits into the right hand end of the sleeve 20 and has an O-ring 104 in its outer surface which sealingly engages the inside of the passage 22 in the sleeve 20. A setscrew 106 in sleeve 20 fits into a groove 108 to lock the fitting in position.

The guide 100 extends through the length of the cable C into and beyond the end of the gas conductor tube 10. The outer surface of guide 100 has a plastic gas tight coating 120 extending from fitting 102 to a point 121 spaced from the exit end 122 approximately 60 cm leaving an uncoated portion 124.

Gases thus flow through the fitting 32 into the space 22 and thence axially between the inner surface of the gas guide 10 and the outer surface of the electrode guide 100 to the welding gun G. Gases can bleed through the turns of the uncoated portion 124 and flow backwards toward the entrant end of electrode guide 100, thus purging air from the coated portion of guide 100 and preventing the electrode from carrying air to the weld area.

The left hand end of the passage 42 is sized to slidingly receive with good electrical contact the right hand end of a nozzle tube 50 which, as shown in FIG. 4, extends to the left in an arcuate manner to guide the electrode and the gases to a contact tip 52 and a gas nozzle 54. An O-ring 53 in the wall of this passage provides a gas tight seal. Nozzle tube 50 is formed of high conductivity copper material and is generally cylindrical in its external shape, although it may be any shape. The tube 50 has an internal non-cylindrical passage 56 e.g., a polygonal shape, preferably square. Inside of the passage 56 is a cylindrical steel tube 57 and a cylindrical electrode wire guide 58 formed of an elongated helix of spring steel wire having an outer diameter generally equal to the smallest transverse dimension of the passage 56. With the cylindrical configuration of tube 57 and guide 58 and the non-cylindrical e.g. polygonal configuration of the passage shown, there is ample clear space for gas flow from the handle through the nozzle tube to the gas nozzle 54. In all cases, the inner diameter of the guide 58 will be such as to appropriately mate with the size of the electrode E to be moved therethrough. The exit end of guide 100 abuts against the entrant end of guide 58 to provide a smooth passage for the movement of electrode E therethrough.

The outer surface of the tube 50 is encased in an insulating coating 62 as is conventional. The nozzle tube 50 has a radius $R_1$ as it leaves the sleeve 40 terminating in short portion 65 with a reverse radius $R_2$.

Positioned adjacent the exit end of the nozzle tube 50 in the polygonal passage 56 is a cylindrical ceramic guide 74 which abuts against the left hand or exit end of the guide 58 and is held in place by a pair of setscrews 76.

The ceramic guide 74 has a cylindrical outer surface to permit the passage of the shielding gases thereby in the spaces provided by the square shape of the bore and a central opening through which electrode E passes.

The left hand or exit end of the nozzle tube 50 is counterbored and threaded as at 64 to receive the threaded end of a gas diffuser 66 which when threaded into position holds a sleeve 68 surrounding the left hand or exit end of the nozzle tube 50 by means of a flange 70 on the end of sleeve 68 being engaged by a shoulder 72 on the gas diffuser 66. The outer surface of the sleeve 68 is threaded as at 78 to mate with internal threads on a gas nozzle 54.

The gas diffuser 66 has an entrant internal passage 84 greater than the diameter of the electrode E, and a plurality of radial passages 86 extending from this passage through which gases can flow into the interior of the gas nozzle 54. The lower end of the gas diffuser 66 is counterbored and threaded as at 88 to threadably receive a contact tip 52 coaxial with the gas nozzle 54 and terminating at its exit end short of the lower or exit end of the gas nozzle 54. The contact tip 52 has a passage therethrough of a diameter just slightly greater than the diameter of the electrode E with which the gun is to be used. Because of the reverse radius $R_2$, the electrode E will be biased against one side of the contact tip 52 by pressure from ceramic guide 74 to provide good electrical contact with the electrode E at a fixed point close to where the electrode exits the tip 52.

Referring now to FIG. 4, the gun G includes a microswitch 150 mounted thereon having an operating button 152 which must be depressed. In order to actuate this button 152, a trigger 154 is provided pivoted to the gun G at 156 and biased to the open position by spring 158. Trigger 154 is constructed so as to have a cantilevered resilient arm 160 which engages the button 152. When the trigger 154 is pivoted upwardly and the button 152 is depressed its maximum distance, any further movement of the trigger 154 results in the arm 160 flexing thus preventing excessive pressures on the button 152. The switch 150 is connected to the electrode feeder and gas source by suitable means which form no part of the present invention. This arrangement provides in a simple and expedient way means for preventing damage to the microswitch by excessive pressure on its control button.

FIGS. 11–14 show an alternative embodiment of the invention for smaller diameter electrodes. In this embodiment of the invention, identical parts to the preferred embodiment are designated with like numbers and changed parts with new numbers. Here nozzle tube 200 has a circular passage 202 therethrough of a diameter greater than the diameter of the uncoated portion 124 of the electrode guide 100 which portion extends through the passage 202 into the passage 84 of the gas diffuser 66 and abuts against the entrant end of contact tip 52. A setscrew 206 in the side of tube 200 forces the end 125 of guide 100 radially so that its central passage is non-aligned with the passage in contact tip 52. This action forces the electrode as it emerges from the guide 125 against the side of the contact tip passage as in the preferred embodiment to establish electrical contact thereto.

The invention has been described with reference to preferred embodiments. Obviously, modifications and alterations will occur to others upon a reading and understanding of this specification and it is my intention to include all the modifications and alterations insofar as they come within the scope of the appended claims.

Having thus described our invention, we claim:

1. A welding gun for gas shielded metal arc welding, including: a handle; a nozzle tube extending arcuately from said handle on a predetermined radius and terminating in a portion having a reverse curvature, said tube having a polygonally shaped passage therethrough having an entrant and an exit end, a cylindrically shaped ceramic guide in the exit end of said passage, a gas diffuser tube on the exit end of said nozzle tube and having an axial passage communicating with said tube passage and radially extending passages, a contact tip extending on the exit end of said gas diffuser tube having a passage of a diameter to pass an electrode; and, a gas nozzle surrounding said gas diffuser tube for directing shielding gases coaxially about an electrode emerging from said electrode nozzle, the axis of said electrode nozzle being at a small angle relative to the axis of the passage of said nozzle tube at said ceramic guide whereby an electrode moving through said guide and tip is biased against a side of said tip.

2. A gun for gas shielded metal arc welding comprising in combination: a handle; a nozzle tube extending arcuately from said handle and having an internal passage; a flexible electrode guide in said passage for guiding an electrode emerging from said handle; a contact tip on the exit end of said nozzle tube and having an electrode passage therethrough, said passage being aligned with the axis of said nozzle tube at the exit end thereof; and, adjustable means in the side of said nozzle tube adjacent the exit end thereof for forcing said guide away from the axis of the inner passage and biasing an electrode against the sides of the passage of the tip.

3. A gun and cable arrangement for gas shielded metal arc welding comprised of: a cable consisting of: a helical steel wire core having a predetermined inside diameter; a copper conductor comprised of a plurality of strands of copper wire around the outside of said core; a first rubber jacket extruded over the outside of said conductor; a first sleeve fitting at one end of said cable having an internal passage threaded at one end to receive an end of said helical steel core and an outer diameter to fit between said conductor and said core, said conductor being soldered to said tube fitting, said gun including a second sleeve fitting at the other end of said cable having an internal passage threaded at one end to threadably engage said core and an outer diameter to fit between said copper conductor and said core, means soldering said copper conductor to said sleeve, an electrode guide extending through said core and said fitting passages, said wire guide including a fitting on one end having external means for sealing against said gun and adapted to be aligned with a passage to the nozzle of said gun and sealing means around the outside of said wire guide including a fitting at one end having external means for sealing against the passage of said first fitting, said wire guide extending into said gun and adapted to be aligned with a passage to the contact tip of said gun and sealing means around the outside of said wire guide extending from said first fitting to a point spaced from the other end of said guide whereby shielding gases can flow in a direction opposite the movement of said electrode to exclude the electrode from carrying air to the welding arc.

4. A welding gun for gas shielded metal arc welding comprising a handle, a microswitch mounted on said handle having a control button, a trigger movably supported on said handle adjacent said button, said trigger having a trigger main body and a resilient cantilevered arm having a first end and a second end spaced from said first end, said resilient cantilever arm first end being connected to said trigger main body and said resilient cantilever arm second end being adapted to engage said button when said trigger is moved toward said handle.

5. The welding gun of claim 4 further comprising a stop rigidly attached to said handle and adapted to engage said trigger main body and prevent further trigger travel when said resilient cantilever second end has engaged said button and closed said switch.

6. A welding gun for gas shielded metal arc welding comprising in combination: a handle; a nozzle tube extending arcuately from said handle and having a polygonally shaped internal passage therethrough, a helical steel wire liner in said passage, gas passages through said nozzle tube in the corners of the passage outside of said helical liner, a gas diffuser means connected to said nozzle tube having an electrode passage therethrough and at least one gas passage connecting said electrode passage to the exterior of said diffuser means, and an electrically conductive contact tip.

7. The welding gun of claim 6 wherein said nozzle tube has a nozzle end and a handle end, said helical steel wire liner has a first external diameter, and a tubular liner is provided disposed at least partially within said polygonally shaped internal passage, said tubular liner having an external diameter approximately equal to said first external diameter and said tubular liner abutting said helical steel wire liner whereby said steel wire liner is retained within said polygonally shaped passage.

8. The welding gun of claim 7 additionally comprising a ceramic guide positioned at the nozzle end of said polygonally shaped passage abutting said steel wire liner and adapted to guide the electrode in its exit from said liner.

9. The welding gun of claim 8 wherein said polygonal passage is square.

10. A gun and cable arrangement for gas shielded metal arc welding comprised of: a cable being comprised of: a helical steel wire core having a predetermined inside diameter; a copper conductor comprised of a plurality of strands of copper wire around the outside of said core; a first rubber jacket extruded over the outside of said conductor; a first sleeve fitting at one end of said cable having an internal passage threaded at one end to receive an end of said helical steel core and an outer diameter to fit between said conductor and said core, said conductor being soldered to said first sleeve fitting, said gun including a second sleeve fitting at the second end of said cable having an internal passage threaded at one end to threadably engage said core and an outer diameter to fit between said copper conductor and said core, said copper conductor being soldered to said second sleeve fitting, an electrode guide extending substantially through the length of said cable within said core and said fitting passages, said electrode guide having first and second ends and being gastight over substantially its entire length, a first guide fitting on said first end of said electrode guide having external means for sealing against the internal passage of said first sleeve fitting, said second guide end being adapted to be aligned with a passage in said gun to a contact tip and extending into said passage in said gun, said guide allowing the passage of gas through itself over a portion of its length near its second end whereby shielding gases can flow into said guide near said second end and thence in a direction opposite the movement of said electrode within said guide to exclude the electrode from carrying air to the welding arc.

* * * * *